United States Patent [19]

Grousseau

[11] Patent Number: 5,101,207

[45] Date of Patent: * Mar. 31, 1992

[54] MLS-TYPE LANDING SYSTEM WITH CENTRALIZED MEANS OF SURVEILLANCE

[75] Inventor: Alain Grousseau, Conflans Ste Honorine, France

[73] Assignee: Thomson-CSF, Puteaux, France

[*] Notice: The portion of the term of this patent subsequent to Mar. 17, 2009 has been disclaimed.

[21] Appl. No.: 626,544

[22] Filed: Dec. 12, 1990

[30] Foreign Application Priority Data

Dec. 15, 1989 [FR] France ................. 89 16617

[51] Int. Cl.$^5$ .................. G01S 13/91; G01S 1/16; G01S 1/18
[52] U.S. Cl. ...................... 342/35; 342/36; 342/410; 342/413
[58] Field of Search ............... 342/35, 408, 410, 411, 342/412, 413, 36

[56] References Cited

U.S. PATENT DOCUMENTS

| | | | |
|---|---|---|---|
| 3,820,074 | 6/1974 | Toman | 340/870.13 |
| 4,568,942 | 2/1986 | Letocquart | 342/408 |
| 4,757,316 | 7/1988 | Brault et al. | 342/173 |
| 4,757,320 | 7/1988 | Letoquart et al. | 342/410 |
| 4,814,773 | 3/1989 | Wechsberg et al. | 342/368 |

OTHER PUBLICATIONS

NEC Research & Development, No. 59, Oct. 1980, pp. 34–35, Tokyo, JP.
G. Onodera et al., "Development of Approach Elevation Equipment in MLS", pp. 40–44.
G.E.C. Journal of Research, vol. 2, No. 2, 1984, pp. 66–75, London, GB.
J. R. Wallington et al., "Optical Techniques for Signal Distribution in Phased Arrays", pp. 67–69.
Navigation, vol. 29, No. 114, Apr. 1981, pp. 174–187, Paris, Letoquart et al., "Le MLS Unexemple d'Utilisation du Microprocesseur", pp. 179–184.
IEEE, Computer Society International Conference, Washington, D.C., Sep. 7–10, 1976, No. 13, pp. 264–268, New York, J. M. Hughes, "Multimicroprocessor Navigation Systems".

*Primary Examiner*—John B. Sotomayor
*Attorney, Agent, or Firm*—Oblon, Spivak, McClelland, Maier & Neustadt

[57] ABSTRACT

It describes a Microwave Landing System wherein.

The means for surveillance of the transmissions from the various MLS stations are centralized in a single central station which then commands the various MLS stations. The connection between the central station and the MLS stations is assured by a network of optical fibers.

4 Claims, 6 Drawing Sheets

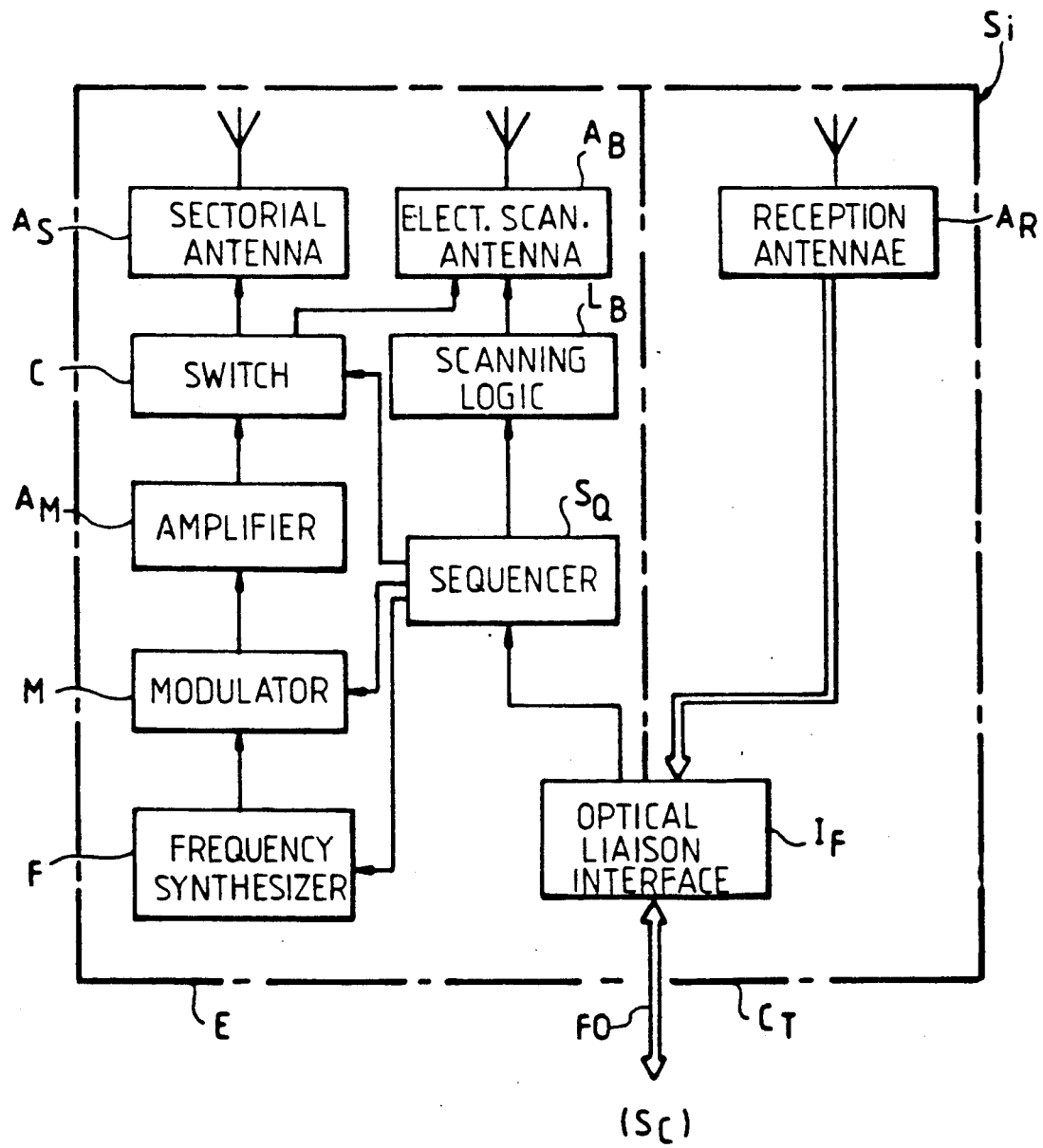

MLS-TYPE LANDING SYSTEM WITH CENTRALIZED MEANS OF SURVEILLANCE

BACKGROUND OF THE INVENTION

The present invention concerns the domain of MLS-type landing systems. Its object is more particularly an MLS comprising centralised means of surveillance.

We recall that the Microwave Landing System (MLS) is a system enabling an aircraft to be guided in to land by providing it with various items of information known as "functions". These comprise angular information, such as its angle of azimuth with respect to the axis of the runway, its angle of elevation with respect to the horizontal, if necessary other information such as rear azimuth for example, and a number of data, some of them "basic" and others "auxiliary". All this information is transmitted permanently from ground level in time-sharing at the same frequency, according to characteristics standardized by the ICAO (International Civil Aviation Organization), appendix 10 paragraph III.11. The ICAO's definition of an MLS also includes a DME (Distance Measuring Equipment). All this information is decoded by every interested aircraft.

Each of the above functions is divided into two parts, which are transmitted one after the other:

A preamble, whose role is to provide the aircraft with an identification of the function which is to follow. This preamble is transmitted by a sectorial antenna, i.e., a fixed antenna covering the whole of the zone, or sector, which the MLS must cover. According to the ICAO standard, the preamble is in the form of a twelve-bit word enabling biunique identification of each function. This binary word is transmitted in DPSK phase modulation (Differential Phase Shift Keying).

The function itself: if this function is a datum, it is transmitted by the sectorial antenna also in DPSK phase modulation. If it is an item of angular information it is constituted of two pulses transmitted using an electronic scanning antenna, according to the principle known as the time-reference scanning beam, which is notably described in French patent application No. 2 549 321 in the name of THOMSON-CSF.

An MLS therefore has at least as many stations as angular functions to be transmitted.

It is seen then that the various items of information required for guidance of an aircraft are transmitted by different stations in succession at the same frequency. It is clear that the order and duration of the transmissions must be strictly adhered to for guidance safety to be ensured, especially during landing, which is a particularly delicate operation. In particular, any overlapping of transmissions must be carefully avoided. To guarantee this security, many devices and solutions are known which make use of:

great redundancy of equipment;
synchronization links between the stations, preferably also redundant;
numerous surveillance loops checking the transmissions.

These different solutions tend to multiply and complicate the equipment and circuits. Their major disadvantage is that they reduce the reliability of the system.

SUMMARY OF THE INVENTION

The present invention proposes to increase the safety of an MLS without reducing its reliability.

For this purpose, according to the invention, the means of surveillance of the transmissions from the different stations are centralized in a single central station, which then commands the different MLS stations, the connection between the central station and the MLS stations being provided by a network of optical fibers.

In a variant embodiment, the microwave signals to be transmitted by the MLS stations are also generated in the central station.

In this way, it is seen that the surveillance of transmissions is performed in better conditions and that the amount of equipment is reduced, thus increasing the safety and reliability of the system and reducing its cost.

BRIEF DESCRIPTION OF THE DRAWINGS

Other objects, characteristics and results of the invention will appear from the following description, given as a non-restrictive example and illustrated by the appended drawings, which represent:

FIGS. 3a and 3b, a first embodiment according to the invention of a central surveillance station and an MLS station adapted to it.

In all these figures the same references refer to analogous elements.

DESCRIPTION OF THE PREFERRED EMBODIMENTS

Figure 1:
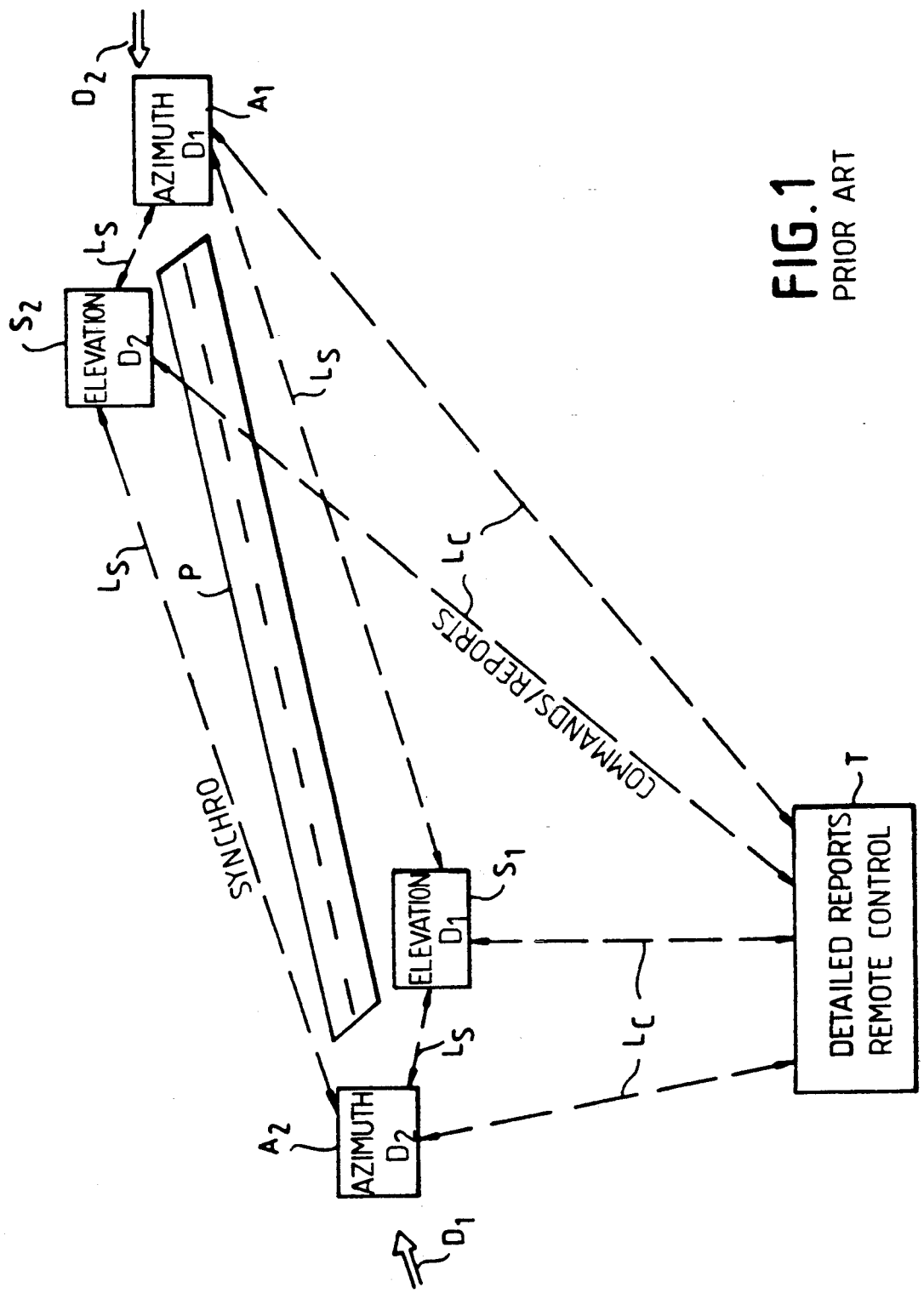
FIG. 1, a diagram of the siting of an MLS of known type.

FIG. 1 is therefore a diagram showing conventional siting of an MLS.

This system comprises a set of MLS stations arranged around a runway, referenced P, which is usually several kilometers long. For a given direction of use of the runway P, for example direction $D_1$, the azimuth angle information is given by a first station $A_1$, placed in the axis of the runway and at the other end of it from the point of landing (or runway approach end). The elevation angle information is given by a second station, referenced $S_1$, which is near the runway approach end and preferably to the side of it. If rear azimuth information is required, the system has a third station, referenced $A_2$, which is placed in the axis of the runway at the runway approach end. When the runway can be used in the other direction (arrow $D_2$), the system has a second set of two stations, azimuth and elevation respectively. The azimuth station for direction $D_2$ can be the same station $A_2$ as that which provides the rear azimuth information for direction $D_1$. The elevation information for direction $D_2$ will be given by a fourth station, referenced $S_2$, in the neighborhood of the runway approach end in direction $D_2$, in the same way as station $S_1$. In addition, distance measuring equipment DME is necessary for each runway direction. It is generally placed in the azimuth station ($A_1$, $A_2$), although this is not necessarily the case. Such DME is for example described in French patent application No. 2 576 111 in the name of THOMSON-CSF.

In order to prevent the transmissions from these different stations from overlapping, all the stations likely to be in use for a given runway direction are connected by synchronization links, represented in the figure by dashed lines and referenced $L_s$.

In addition, these different stations are connected to a control room T by links $L_c$, shown by dashed lines, which give an operator remote control of the operation of the stations and enable the operator to receive their detailed reports.

Figure 2:
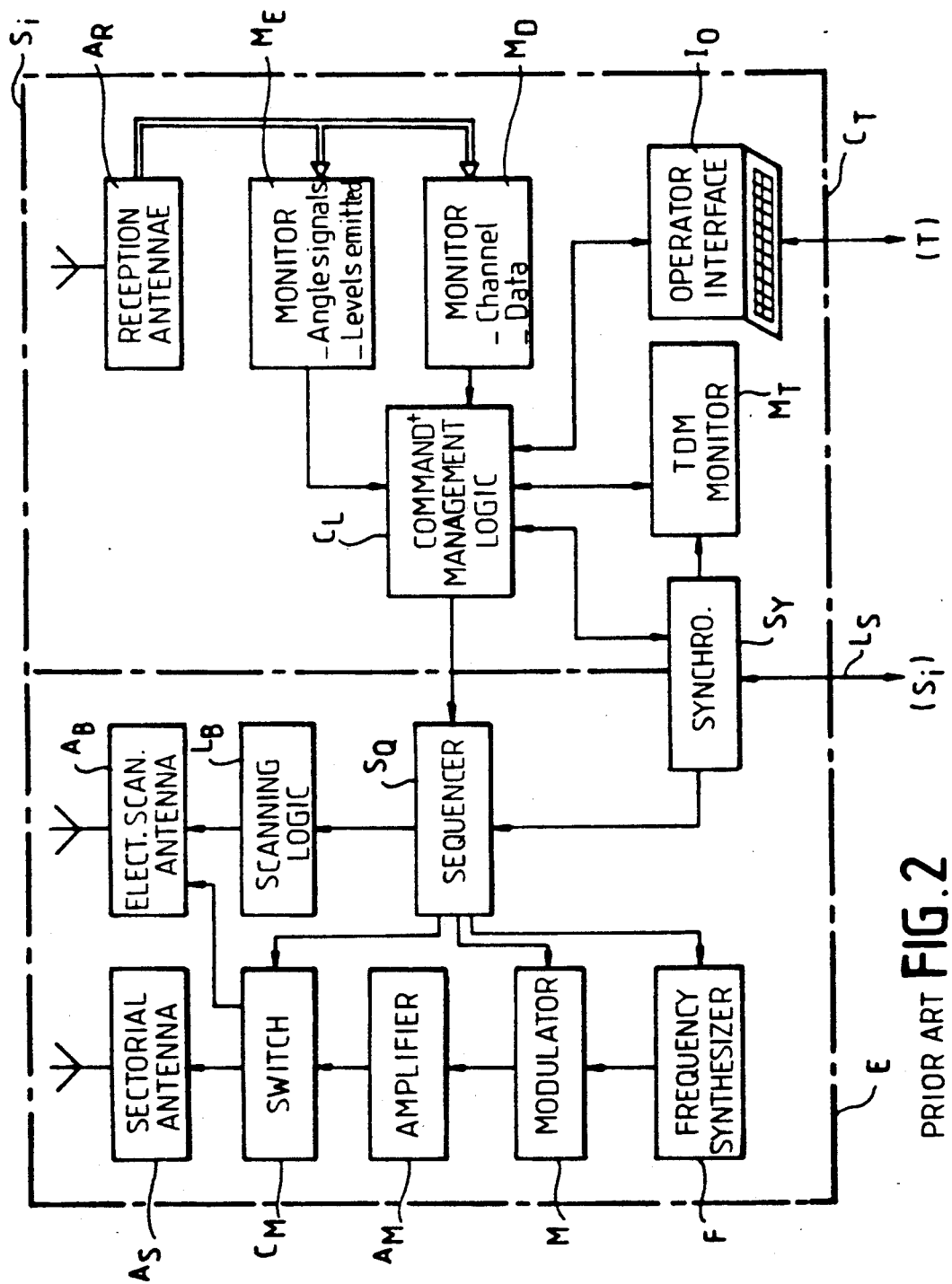
FIG. 2, a synoptic diagram of a prior art MLS station.

FIG. 2 is a synoptic diagram of a prior art MLS station.

Such a station is responsible for transmitting one of the MLS functions (azimuth, elevation, rear azimuth . . . ). It is referenced $S_i$ and represents one of the MLS stations in FIG. 1 ($S_1$, $S_2$, $A_1$ or $A_2$).

This station $S_i$ is essentially formed of two parts, one part on the left of the figure, referenced E, comprising the station's means of transmission, and one part on the right of the figure, referenced $C_T$, comprising the means for controlling the operation of the station.

The transmitting part E comprises, in cascade:

A frequency synthesizer F, giving a sinusoidal signal for forming a carrier wave, whose frequency is close to 5 GHz according to the ICAO standard (according to this standard, one frequency, or channel, among 200 predefined frequencies close to 5 GHz, is assigned to each MLS).

A modulator M of the signal supplied by the synthesizer F, which performs a two-state DPSK phase modulation, enabling the preamble and the data to be transmitted.

A microwave amplifier $A_H$, using tubes or transistors depending on the power required. This is conventionally about 20 Watts and therefore the amplifier usually uses transistors.

A switch $C_M$, connected both to a sectorial antenna $A_s$ and an electronic scanning antenna $A_B$ and, if required, to antennae (not shown) known as OCI (Out of Coverage Indicator), whose function is to indicate to the aircraft that, being outside the zone covered by the MLS, it must ignore the signals it receives. The function of the switch $C_M$ is to switch the signal produced by the previous chain towards one of the antennae.

The means of transmission E also includes a sequencer $S_Q$, which controls the parts F, M, $A_H$ and $C_M$, as well as the electronic scanning antenna $A_B$ via a scanning logic circuit $L_B$.

In this way and under the control of the sequencer $S_Q$, the means of transmission F to $A_H$ supply a signal, via the switch $C_M$, either to the sectorial antenna $A_s$ for transmission of the preamble and the data, to the electronic scanning antenna $A_B$ for transmission of the angular information, or to the OCI antenna for indications of an out of cover situation.

The control part $C_T$ of the MLS station comprises:

A set of reception antennae $A_r$, or sensors, to receive the signal as transmitted by the station $S_i$. This unit can comprise an external sensor, for example a horn antenna, analogous to the receiver carried by the guided aircraft, placed at a few tens of meters from the antennae. It can also comprise a signal-picking device situated at each of the antennae, known as an integral monitor.

A set of three monitors: $M_E$, $M_D$ and $M_T$, each of which performs predefined tests on the information it receives from the reception antennae $A_R$, i.e. they perform measurements on these items of information and compare them with reference values in their memories. When the differences between the results of measurement and the reference values exceed predefined limits, the monitors give an alarm signal for the data for which they are responsible. The monitor $M_E$ is responsible for the surveillance of the levels of the signals transmitted by the antennae and the position of the pulses corresponding to the angular information. The monitor $M_D$ is responsible for surveillance of the transmission frequency which must, as noted above, correspond to a predetermined MLS channel, and the preambles and data transmitted by the sectorial antenna. The monitor $M_T$, known as a TDM monitor, is responsible for surveillance of the time-division multiplexing of the various items of MLS information.

Logic circuits $C_L$ for control and management, generally constituted of a microprocessor, receiving the signals from the various monitors and consequently controlling the on/off status of the station via one or more of the elements F, M, $A_H$, $C_M$ and $S_Q$.

The control part also comprises means $I_O$ for interfacing with an operator, these means being connected to the control logic circuits $C_L$ and able to exchange remotely-controlled orders and reports with the control room T (FIG. 1).

The station described here comprises a single transmission chain. For reasons of availability, safety or reliability, it can of course be doubled. This leads to the creation of a second chain E and to the corresponding modification of the means assuring the functions of control, command and management.

The station $S_i$ also comprises a circuit $S_y$ for transmission and reception of the synchronization information transmitted via the links $L_S$ from the other stations $S_i$ of the MLS. In order to ensure synchronization between the stations $S_i$, one of the possible solutions is that each of the stations sends one (or more) synchronization pulse(s) to the station coming after it in the order of transmissions, on command by the logic unit $C_L$ and via the circuit $S_y$ and the link $L_s$. The reception of this pulse by the circuit $S_y$ of the station concerned, possibly after a predefined delay, triggers the transmission via the sequencer $S_Q$. It can also trigger the sending of an acknowledgement to the station which transmitted the synchronization pulse. More generally, the aim of the synchronization is to ensure the sequencing of the transmissions according to the ICAO standards, using exchanges of orders and reports on the network of links $L_s$. Moreover, the monitor $M_T$ carries out surveillance of the multiplexing on the basis of the information it receives from the circuit $S_y$ and from its own station.

It appears then that the non-overlapping of the different MLS transmissions rests entirely on the reception of synchronization pulses, with the risk inherent in this type of process.

Figure 3A:
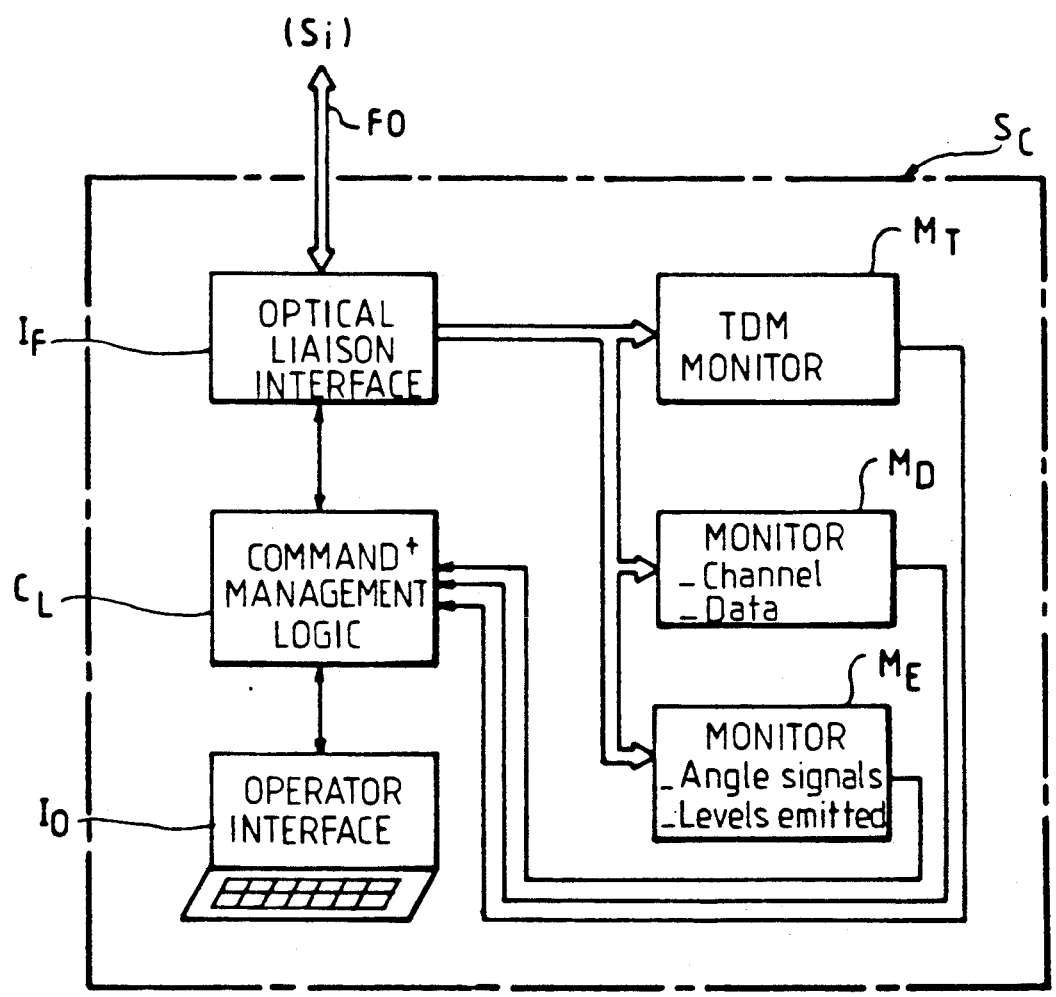

FIG. 3a represents a first embodiment according to the invention of a central surveillance station for an MLS.

According to the invention, all the MLS stations, referenced $S_i$, are connected to a central station $S_c$ via an optical fiber network FO.

In the central station ($S_c$), the signals are received by an optical link interface $I_F$ in order to be transformed into electrical signals. They are then sent to a TDM monitor $M_T$, a channel and data monitor $M_D$ and finally a monitor $M_E$, which surveys the angular function signals and the levels transmitted by the antennae. The results of all the tests performed by these monitors are sent to a logical command and management unit $C_L$, which is also in link with an operator interface $I_O$ and the optical link interface $I_F$.

Typically, the interface $I_F$ comprises a diode laser which converts an electrical signal into an optical signal to be sent to the network FO, and a photo-diode which carries out the reverse conversion. It can also include means for multiplexing-demultiplexing. The optical fiber network FO can be of any known type, for example with a star or ring topology, or formed by a set of point-to-point links, each link having one or more optical fibers.

FIG. 3b represents an MLS station $S_i$, adapted to receive the signals transmitted by the central station represented in FIG. 3a.

As before (FIG. 2), the station $S_i$ has a transmission part E and a control part $C_T$.

The transmission part E is identical to that described with reference to FIG. 2, except as regards the command of the sequencer $S_Q$ which, here, is performed not by the synchronization receiver $S_y$ (FIG. 2) but by an optical link interface $I_F$. This interface is analogous to that in FIG. 3a, itself connected to the optical fiber network FO coming from the central station $S_c$.

The control part $C_T$ is here very much simplified since it now contains only the reception antennae $A_R$, which are connected directly via the interface $I_F$ and the optical network FO to the central station $S_c$.

The unit formed by the central station $S_c$ (FIG. 3a) and the MLS stations $S_i$ (FIG. 3b) functions as described below.

Under the control of the central logical unit $C_L$, via the optical network FO, each of the stations $S_i$ transmits in its turn the MLS signals for which it is responsible.

The control information provided by the sensors $A_R$ of each station $S_i$ are sent via the optical network FO to the central station $S_c$. For this purpose, the signals from each sensor can be multiplexed at the interface $I_F$ of each station $S_i$, and demultiplexed in the same way in the central station $S_c$. According to another embodiment, the signals from each sensor can be sent to the central station $S_c$ by different optical fibers, for example by direct modulation of the light wave emitted by the diode laser. In this case the command signals are either multiplexed with the previous ones or are also sent by a different optical fiber.

It should be noted that the interface $I_F$ of the central station in addition ensures, if necessary, the compensation of the differences in propagation time in the optical network FO between the station $S_c$ and the various stations $S_i$.

The time-sharing of the different MLS signals, as received by the aircraft to be guided, is therefore recreated in the central station $S_c$. Consequently, the control is performed in better conditions, since they are closer to the real conditions than in the conventional system as described with reference to FIGS. 1 and 2.

Moreover, this increase in safety is not gained by an increase in the complexity of the system, but, on the contrary, is accompanied by a reduction in the number of circuits necessary for a given redundancy: henceforth only one of each of the parts is required in the central station $S_c$, whereas before one was needed for each of the MLS stations $S_i$.

One consequence of this is an increase in reliability. It is known that the reliability of a chain of sub-assemblies is an inverse function of the number of sub-assemblies making up the chain. More precisely, if the failure rate of a sub-assembly i is $p_i$, the probability P of operation of the chain at the instant t is:

$$P = e^{-pt}$$

where $$p = \sum_i p_i$$

For a redundant chain, where the sub-assemblies are doubled, $e^{-p_it}$ is replaced by $(2e^{-p_it} - e^{2p_it})$.

Moreover, the safety of the system also depends on the risk of sending out an erroneous and therefore dangerous signal. The probability $P_R$ of sending out such a signal is the product $$P_R = P_{em} \cdot P_{pc}$$

where:

$P_{em}$ is the probability of a failure of the transmission unit (restricted to the case of a dangerous signal). It is an inverse function of the reliability of the transmission unit.

$P_{pe}$ is the probability that a failure is not seen by the control unit (failure hidden from the control unit). This is an inverse function of the reliability of the control unit.

Safety is therefore a function of the product of the reliability of the transmission unit by the reliability of the control unit. It is therefore increased by the improvement in the reliability of the control unit.

Finally, another consequence of the reduction in the number of circuits is of course a reduction in the cost of the system.

Figure 4A:
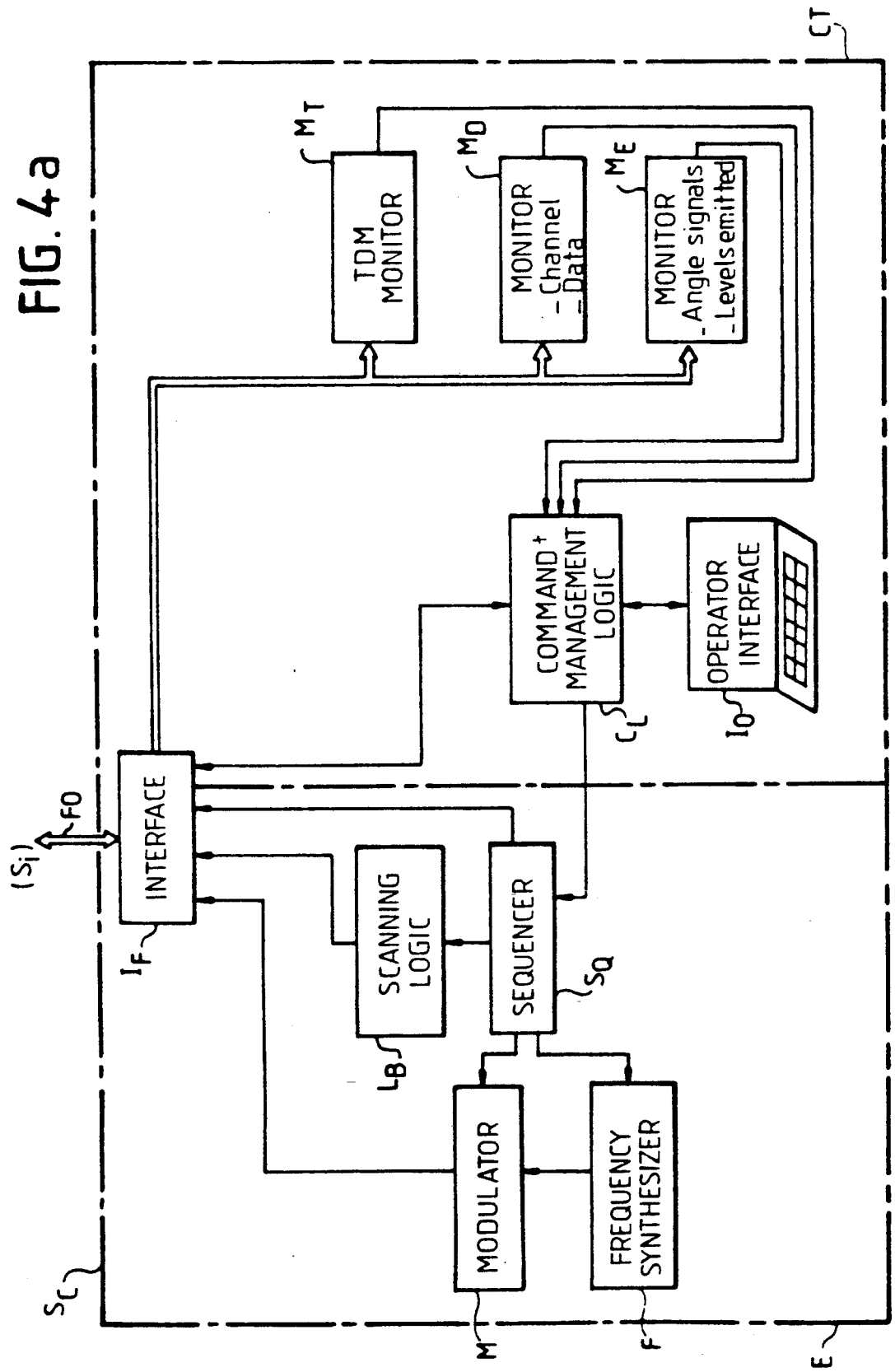
FIGS. 4a and 4b, a second embodiment according to the invention of a central surveillance station and an MLS station adapted to it.

FIG. 4a represents a second embodiment of a central station for an MLS system according to the invention.

This station $S_c$ comprises a part E, which generates a microwave signal, and a part $C_T$ which controls it.

The transmission part E comprises a frequency synthesizer F and a phase modulator M analogous to those of conventional MLS stations (FIG. 2), which give a modulated microwave signal, under the command of a sequencer $S_Q$ analogous to that in FIG. 2. This signal is sent to the optical interface circuit $I_F$. The transmission part E also comprises the scanning logic circuit $L_B$, commanded by the sequencer $S_Q$ and sending its command signals to the interface $I_F$. As before, the interface $I_F$ can include means for multiplexing-demultiplexing. In one embodiment, the network FO is a network of point-to-point links, each link comprising an optical fiber assigned to the transmission of the signals produced by the transmission part E. In this case, the microwave signal modulated by the modulator M directly modulates the frequency of the optical wave emitted by the diode laser of the interface $I_F$ in the optical fiber for transmission, and the other information to be transmitted is for example multiplexed and transmitted by any means in the remaining pass band of the same optical fiber.

The control part $C_T$ comprises the same elements as those described with reference to FIG. 3a, except that the logical command and management circuit $C_L$ is also connected to the sequencer $S_Q$.

Figure 4B:
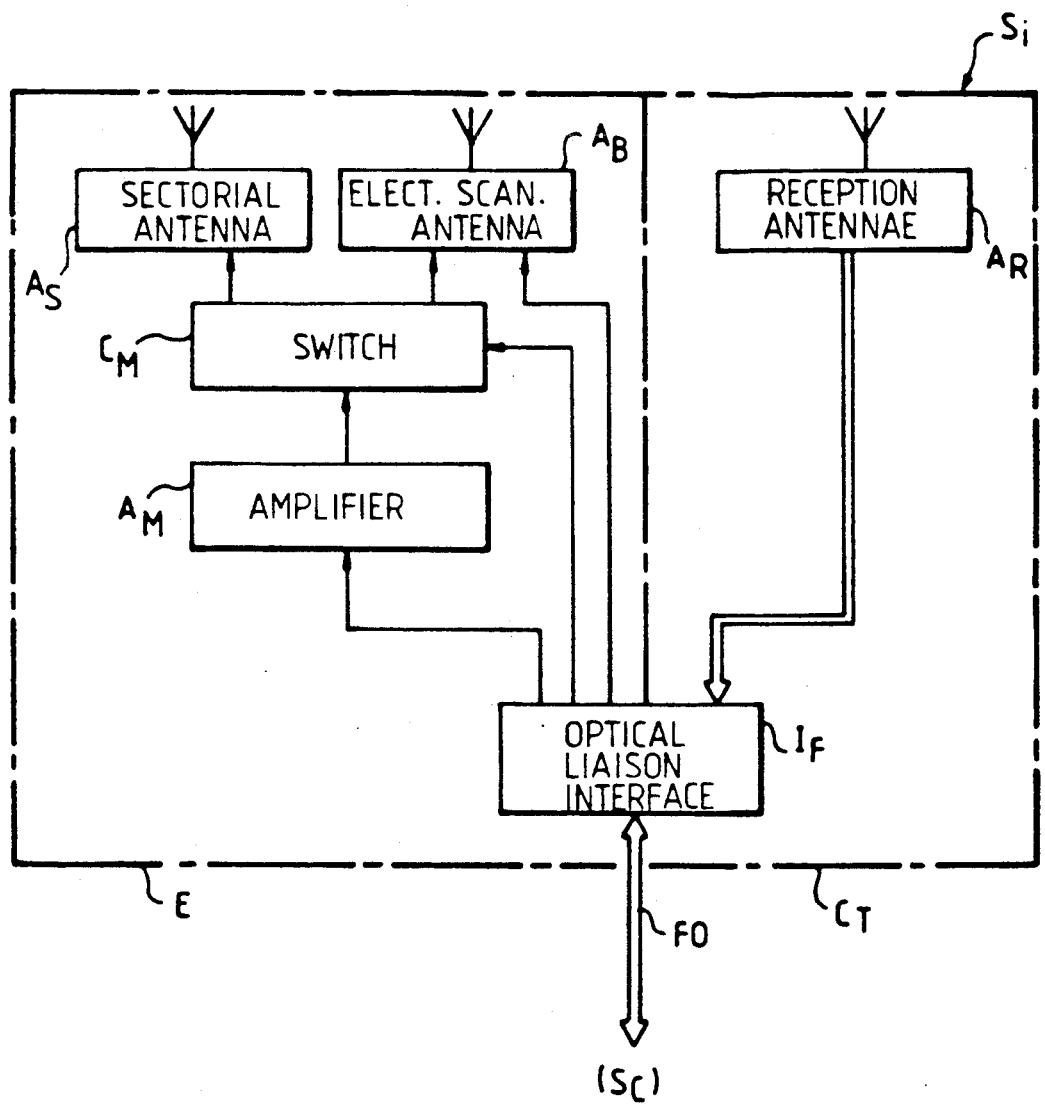

FIG. 4b represents an MLS station $S_i$ adapted to receive the signals transmitted by a central station such as that represented in FIG. 4a.

The station $S_i$ also comprises an transmission part E and a control part $C_T$.

The control part $C_T$, as before (FIG. 3b), comprises only the reception antennae $A_R$, connected directly to the interface $I_F$.

The transmission part E now comprises only the microwave amplifier $A_H$, receiving the signal to be amplified from the interface $I_F$ and transmitting it to the switch $C_M$, itself commanded by the interface $I_F$ and sending the signal to be transmitted either to the sectorial antenna $A_S$ or to the electronic scanning antenna $A_B$, or to the OCI antennae (not shown).

This second embodiment, which integrates all the means of transmission, excluding amplification and antennae, into the central station, has various advantages.

First, it accentuates the effects described above of reduction in equipment and increase in safety and reliability.

Notably, as mentioned above, the safety of the system is a function of the product of the reliability of the transmission unit by the reliability of the control unit. It is therefore increased here by the improvement in the reliability of both units.

Moreover, as all the signals are here generated sequentially and in the same place, the synchronization of the different transmissions is performed automatically, and the TDM monitor $M_T$ of the central station now only has to verify that the transmission part E of this station is operating correctly. The safety of the system is thus again greatly increased.

What is claimed is:

1. MLS-type landing system, consisting in transmitting to an aircraft, in time-sharing multiplexing on a single carrier frequency, information known as functions, comprising successively a preamble and either data or angular information, the system comprising at least two MLS stations, each of which comprising:
   a sectorial antenna, ensuring the transmission of the preambles and data, in the form of the phase-modulated carrier wave;
   an electronic scanning antenna, ensuring the transmission of the angular information, in the form of beam sweeping of a wave at the carrier frequency;
   means for controlling the operation of the MLS station; the system further comprising a central station, comprising control means, connected to the controlling means of the MLS stations by at least one optical fiber, and interface means for the optical fiber with the control means; the control means of the central station comprising:
   first monitor means for controlling the time-sharing multiplexing of the MLS functions, connected to the interface means;
   second monitor means for controlling the carrier frequency and the data, connected to the interface means;
   third monitor means for controlling the angular information and the level of signals transmitted, connected to the interface means;
   logical means for commanding and managing the central station and the MLS stations, connected to all the monitor means and the interface means; each of the MLS stations further comprising interface means for the optical fiber with its controlling means, said controlling means comprising at least one antenna for reception of the signals transmitted by the MLS station, sending these received signals via the interface means to the central station.

2. System according to claim 1, wherein each of the MLS stations comprises transmission means, these transmission means comprising:
   means for generation of a signal at the carrier frequency;
   means for modulating of the previous signal by the preambles and the data;
   means for amplifying the signals received from the modulating means;
   a switch for switching of the amplified signals between the sectorial antenna and the electronic scanning antenna.

3. System according to claim 1, wherein the central station further comprises transmission means, which comprises:
   means for generating a signal at the carrier frequency;
   means for modulating the previous signal by the preambles and the data, sending the modulated signal via the interface means to the MLS stations.

4. System according to claim 3, wherein each of the MLS stations further comprises transmission means, comprising:
   means for amplifying the signals received from the central station by the interface means;
   a switch for switching the amplified signals between the sectorial antenna and the electronic scanning antenna.

* * * * *